US005268773A

United States Patent [19]

Park et al.

[11] Patent Number: 5,268,773

[45] Date of Patent: Dec. 7, 1993

[54] DOCUMENT IMAGE SIGNAL PROCESSOR HAVING AN ADAPTIVE THRESHOLD

[75] Inventors: Yong-Woo Park; Min-Ki Yeo, both of Suwon; Young-Chul Kim, Seoul; Dong-Yool Kim, Seoul; Hong-Jik Lee, Seoul, all of Rep. of Korea; Hideki Koide, Tokyo, Japan

[73] Assignee: SamSung Electronics Co., Ltd., Suwon, Rep. of Korea

[21] Appl. No.: 501,802

[22] Filed: Mar. 30, 1990

[51] Int. Cl.$^{5}$ .............................................. H04N 1/40

[52] U.S. Cl. .................................... 358/466; 358/475; 358/464; 358/460; 358/461; 382/50

[58] Field of Search ............... 358/453, 455, 460, 461, 358/464, 465, 466, 475; 382/50, 51, 54, 56

[56] References Cited

U.S. PATENT DOCUMENTS

| | | | |
|---|---|---|---|
| 4,442,544 | 4/1984 | Moreland et al. | 582/53 |
| 4,468,704 | 8/1984 | Stoffel et al. | 358/466 |
| 4,593,325 | 6/1986 | Kannapell et al. | 358/455 |
| 4,908,875 | 3/1990 | Assael et al. | 358/466 |
| 5,065,257 | 11/1991 | Yamada | 358/464 |
| 5,081,690 | 1/1992 | Tan | 358/466 |
| 5,086,484 | 2/1992 | Katayama et al. | 358/465 |
| 5,097,520 | 3/1992 | Bessho et al. | 358/466 |

FOREIGN PATENT DOCUMENTS

| | | | |
|---|---|---|---|
| 0070161 | 1/1983 | European Pat. Off. | 382/50 |
| 0118905 | 9/1984 | European Pat. Off. | 358/466 |
| 0204378 | 11/1984 | Japan | 358/466 |

OTHER PUBLICATIONS

D. M. Hancock—Improved Dynamic Thresholding algorithm for image Binarization, IBM Nov. 1978 vol. 21 No. 6 (358–466).

*Primary Examiner*—John K. Peng
*Assistant Examiner*—Nina Tong
*Attorney, Agent, or Firm*—Robert E. Bushnell

[57] ABSTRACT

A document image signal processor of gray level for use in a facsimile. The document image signal processor establishes a local window and a broad window from document image signals scanned by a CCD image sensor. An average level and a level difference between a maximum and a minimum level of the image signals are extracted from the local window. A maximum threshold of the background of the document image is extracted from the broad window. Thus, the image signals can be binarized with an adaptive threshold. Accordingly, the inventive image signal processor provides improved image, although the document image is collected (scanned) from a material whose brightness distribution is considerably ununiform. The document image signal processor includes a line-memory for reading/writing the document image signal, a local window register for forming a local image window, a broad window register for forming a broad image window register, an address and clock generator for generating address and control clocks, and an adaptive threshold logic unit for producing black/white decision logic of the center pixel.

21 Claims, 14 Drawing Sheets

| | | |
|---|---|---|
| P (−1,−1) | P (1,−1) | P (1,−1) |
| P (−1,0) | CEN P (0,0) | P (1,0) |
| P (−1,1) | P (0,1) | P (1,1) |

DOCUMENT IMAGE SIGNAL PROCESSOR HAVING AN ADAPTIVE THRESHOLD

BACKGROUND OF THE INVENTION

The present invention generally concerns a document image signal processor in a document-reading machine such as a facsimile and, more particularly, a circuit for processing document image signals of gray level.

Generally, a document image signal processor, such as a facsimile, an image scanner or an OCR (Optical Character Reader) has a mechanical section for transferring a document to a desired position and an image sensor for scanning image signals of a document. According to a conventional technique of the document image signal processor, image signals of a document scanned by means of the image sensor are converted into a black or white image by comparing the gray level thereof with a fixed, invariable threshold voltage.

Referring to FIG. 1, a conventional document image signal processor preferably for use in a facsimile system is diagrammatically shown in block diagram. Regarding the operation of the conventional document image processor, a CCD (Charge Coupled Device) image sensor 13 performs main scanning of a document (not shown) through line scanning. In this way, the CCD image scanner 13 converts optical document image signals into electric document image signals. The electric document image signals converted by the CCD image sensor 13 are applied to an analog-to-digital converter (ADC) 15 coupled to the CCD image sensor 13. Then, the image signals are converted into digital data having a predetermined bit number and the digital data converted is provided to a shading correction part 17 as an image scan data of the document. The image scan data having ununiform distribution of fluorescent light is equalized (corrected) by the shading correction part 17 and thereafter applied to a hard decision logic block 19. The hard decision logic block part 19 decides whether the document image scan data is black or white by comparing the document image data, which is corrected in the shading correction part 17, with a threshold value fixed at a predetermined level.

As occasion demands, the output decision logic of the hard decision logic part 19 is transmitted in serial to a printing part (not shown) so as to print the image signals by means of a TPH (Thermal Print Head). Otherwise, the output decision logic is transmitted to a CPU (Central Processing Unit) 23 and a memory device 25 for storing the decision logic through an interface 21. The interface 21 which is coupled to the output of the hard decision logic part 19 converts the output decision logic of the hard decision logic part 19 into parallel data with a predetermined bit number and sends a DMA (direct memory access) request signal to the CPU 23. The CPU 23 receiving the DMA request signal provides the interface 21 with a response signal to the DMA request signal so as to access parallel data with predetermined bit numbers and store the parallel data the memory 25.

In this case, the hard decision logic part 19 determines whether an image signal is black or white by comparing it with the medium gray level of a fixed value, such as the Dither Pattern of Bayer. However, in the conventional document image signal processor operating in the above manner, the image signals are subject to being degraded, because the image signals are binarized into black or white with a fixed threshold of the hard decision logic part 19 even in case the luminance difference between the document image signals and background image signals of the document is relatively small.

The above-mentioned drawback of the conventional image signal processor is detailed hereinbelow with reference to FIG. 2. In the drawing, there is shown an example of the gray image signal obtained by one-dimensional scanning in direction of the arrows over a Chinese character printed on a white paper, wherein the high level is bright and the lower is dark. A group 3 (G3) facsimile system of which resolution is 200 DPI (dots per inch) is used to obtain the result. The overall gray level is graded into 16 levels. The brightness of image scan signals obtained from photo cells of the CCD image sensor may be widely distinguished into a black level below the level 6 and a white level above the level 11. It is slightly different from the human eye system in view of the manner of recognizing black and white. It will be well understood that black and white can not be clearly distinguished at an adjacent area between the gray level 5 and the levels 11, and that the black and white level corresponding thereto can be hardly distinguished from each other. For example, the black level existing between the pixel number 4 and the pixel number 6 is considerably increased, while the white level at the same position is reduced. As shown through the example data of FIG. 2, when the gap between the black and white level reaches gradually to the size of the substantial pixel, the white level is lowered and the black level is contrarily increased, thereby the two opposite levels approach the same level. It is well known from the above explained phenomenon that the level of image signal classified as the gray zone (a zone between Tmax and Tmin) is much affected by an averaging effect of photo-cell in the CCD image sensor. It should be noted that the pixels 4, 12, 14, 16 have the same gray level 9 even in the fact that the pixel 4 is substantially of the black level and other three pixels 12, 14, 16 are substantially of the white level as obvious from considering the like corresponding part of the Chinese character.

Therefore, when the document image signals are binarized by using a single fixed threshold value, the image signals are considerably degraded, compared with the original image recognized by way of 1 human eye system, because the threshold value must exist between the Tmax and Tmin to binarize the image signals. A most typical case including the above mentioned difficulty in distinguishing black and white would be a newspaper or a photograph in which the variation of brightness distribution is very considerable. In this case, distinguishing the black and white is difficult if a only single fixed threshold is employed.

SUMMARY OF THE INVENTION

Accordingly, an object of the present invention is to provide a device for processing image signals of characters printed on a material having a considerable variation of the brightness distribution on its background, by using an adaptive threshold technique, thereby producing improved image signals.

According to an aspect of the present invention, a device for processing a document image signal scanned from an image sensor including: a line-memory for reading/writing the document image signal and outputting the document image signal of a preceding scan line and the scan line before said preceding scan line, on a basis of a read/write enable signal; a local window register for shifting a document image signal of the present scan line, a preceding scan line and a scan line before said preceding scan line, and forming a local window having a predetermined size, said document image signal of said preceding scan line and said scan line before said preceding scan line being delayed by said line-memory; a broad window register coupled to said line-memory, for shifting the document image signal of the preceding scan line outputted from the line memory with one scan line of delay, for forming a horizontal broad window and for producing broad window data as a sample data thereof; an address and clock generator for generating shift clock, latch clock, output enable clock, write enable and address signals to provide to said line-memory, local memory and broad window register; and an adaptive threshold logic unit coupled to the output of said local window register and broad window register, for extracting a level difference value between a maximum value and a minimum value, an average therebetween and a center value therebetween from said local window formed by the local window register, for extracting a maximum value from said broad window formed by the broad window register, and thereby producing black/white decision logic of said center value.

The above and other objects, effects and features of the present invention will be apparent from the following description of the preferred embodiments thereof taken in conjunction with the accompanying drawings.

BRIEF DESCRIPTION OF THE DRAWINGS

For a better understanding of the invention and to show how the same may be carried into effect, reference will now be made, by way of example, to the accompanying diagrammatic drawings, in which.

Some reference numerals are used to designate similar parts throughout the figures.

DETAILED DESCRIPTION OF THE PREFERRED EMBODIMENT

A preferred embodiment according to the present invention will now be described hereinbelow in detail, with reference to the accompanying drawing, by way of an example.

Figure 1:
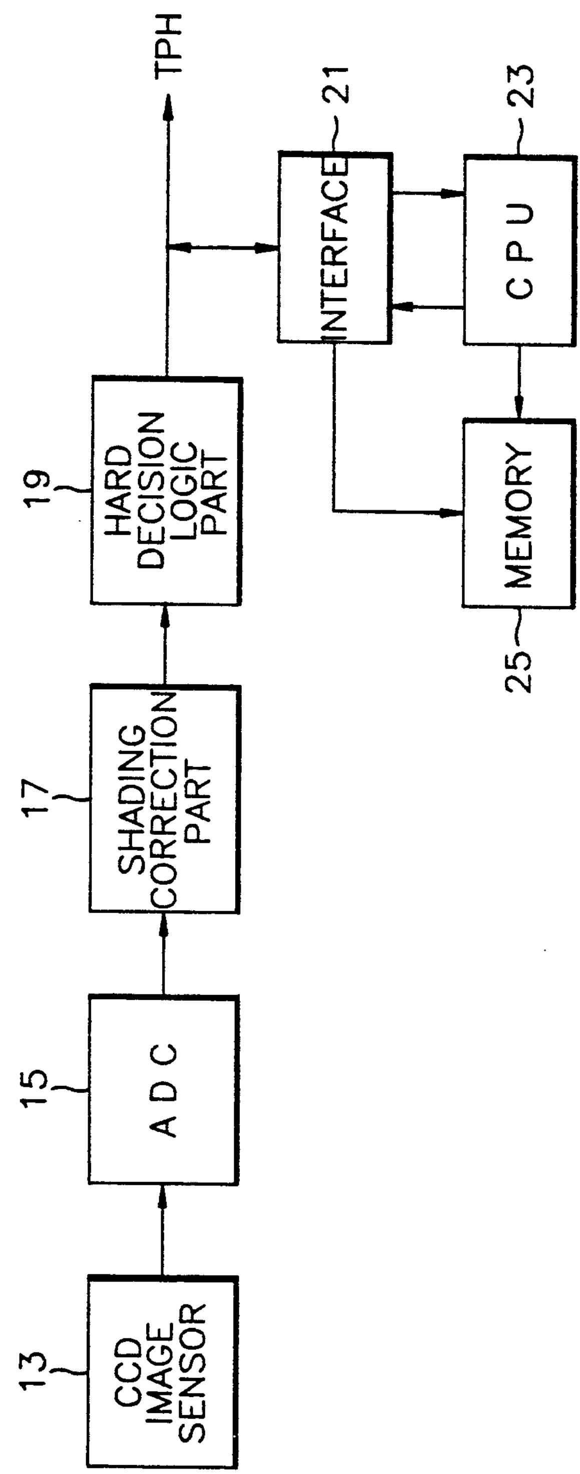
FIG. 1 is a block diagram of a prior image signal processor.
Figure 2:
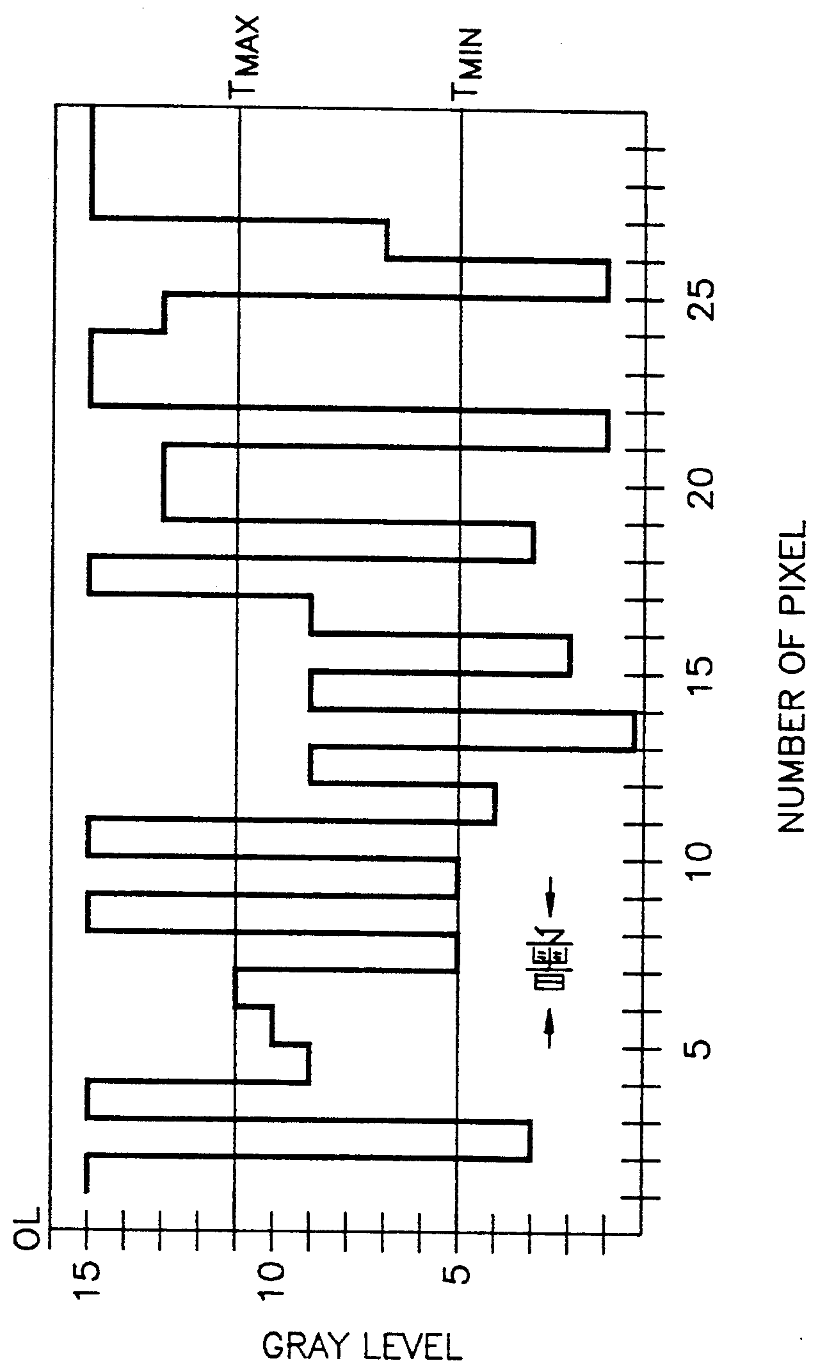
FIG. 2 is an example graph of a gray image signal obtained by one-dimensional scanning over a Chinese character.
Figure 3:
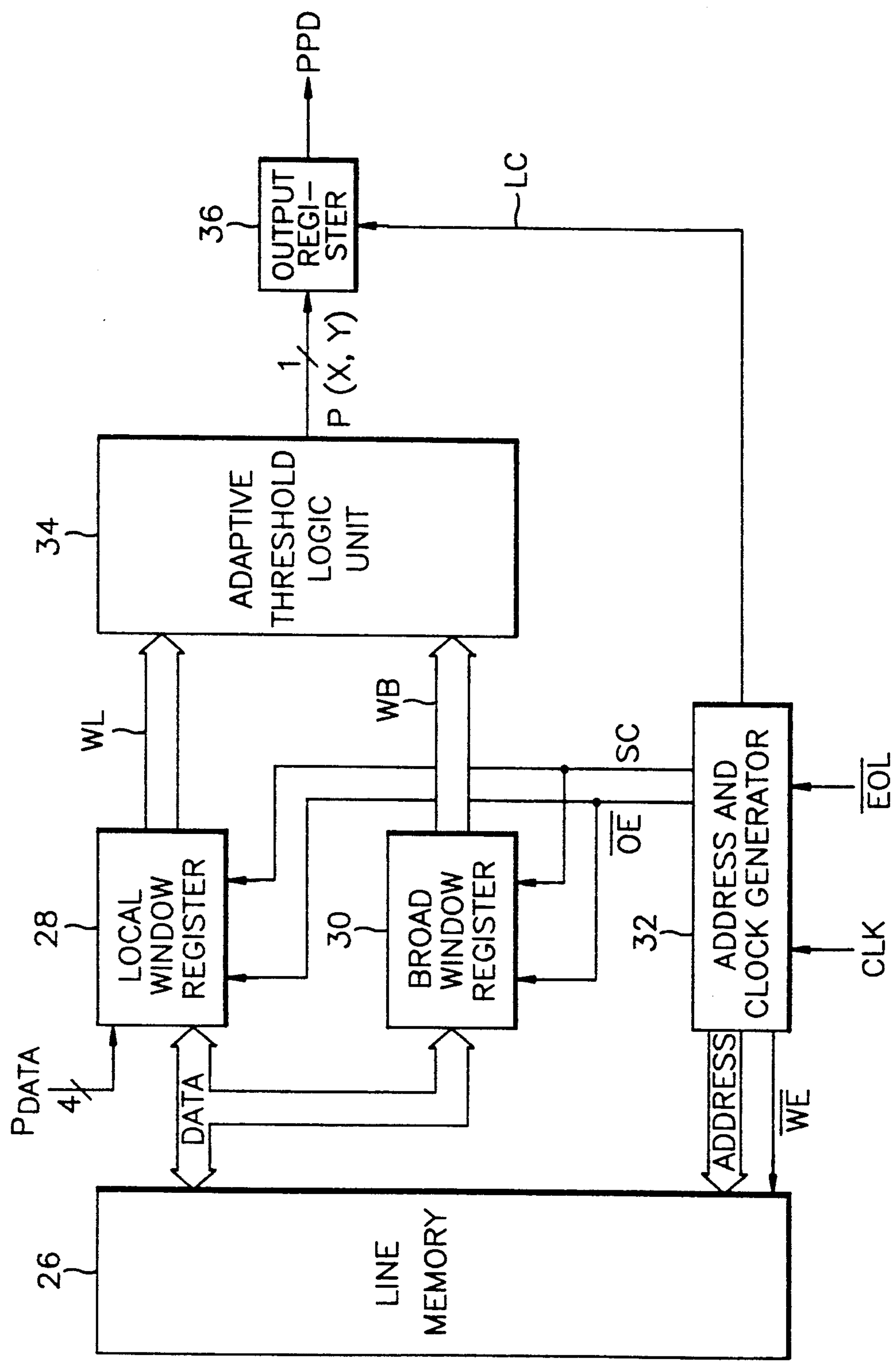
FIG. 3 is a block diagram of an image signal processor embodied according to the present invention.

In FIG. 3, there are shown a line memory 26, a local window register 28, a broad window register 30, an address and clock generator 32, an adaptive threshold logic unit 34, and an output register 36. The image signal processor embodied according to the present invention assesses document image scan data (hereinbelow, referred to as pixel data) from the line memory 26 on the basis of the address and control signal and then pixel data of a previous scan line and pixel data of the scan line before the previous scan line is provided to the local window register 28 and the broad window register 30, at the same time. Pixel data of a present scan line and the delayed pixel data received from the line memory 26 are shifted to form a three-by-three local window $WL_N$ by means of the local window register 28. Then local window data WL upon the basis of the three-by-three local window are transferred to the adaptive threshold logic unit 34. At about the same moment, the delayed pixel data of the previous scan line, provided from the line memory 26, are shifted at the broad window register so as to form a horizontal broad window $WB_N$ and to produce broad window data WB as sampling data thereof to the adaptive threshold logic unit 34.

On the other hand, the address and clock generator 32 receiving a clock CLK signal which is synchronized with the sampling clock of the CCD image sensor and receiving an EOL (end of line) signal which is provided in a given period generates shift clock SC, latch clock LC, output enable signal $\overline{OE}$, write enable signal $\overline{WE}$ and address signals ADD, the above signals generated being provided to the line memory 26, the local window register 28, the broad window register 30 and the output register 36, as illustrated FIG. 3.

The adaptive threshold logic unit 34 then extracts a level difference DEL, an average value AVE and a center value CEN between a maximum value $WL_{MAX}$ and a minimum value $WL_{MIN}$ of the local window $WL_N$ produced from the local window register 28 and, at the same time, extracts a maximum value $WB_{MAX}$ of the broad window $WB_N$ from broad window register 30. The above respective values are compared with one another and the compared result is logically combined to binarize the center value CEN, the resultant logic P(X,Y) of the center value CEN being provided to the output register 36. Thereafter, the result logic P(X,Y) is buffered at the output register 36 upon the basis of the latch clock LC generated from the address and clock generator 32.

Figure 4:
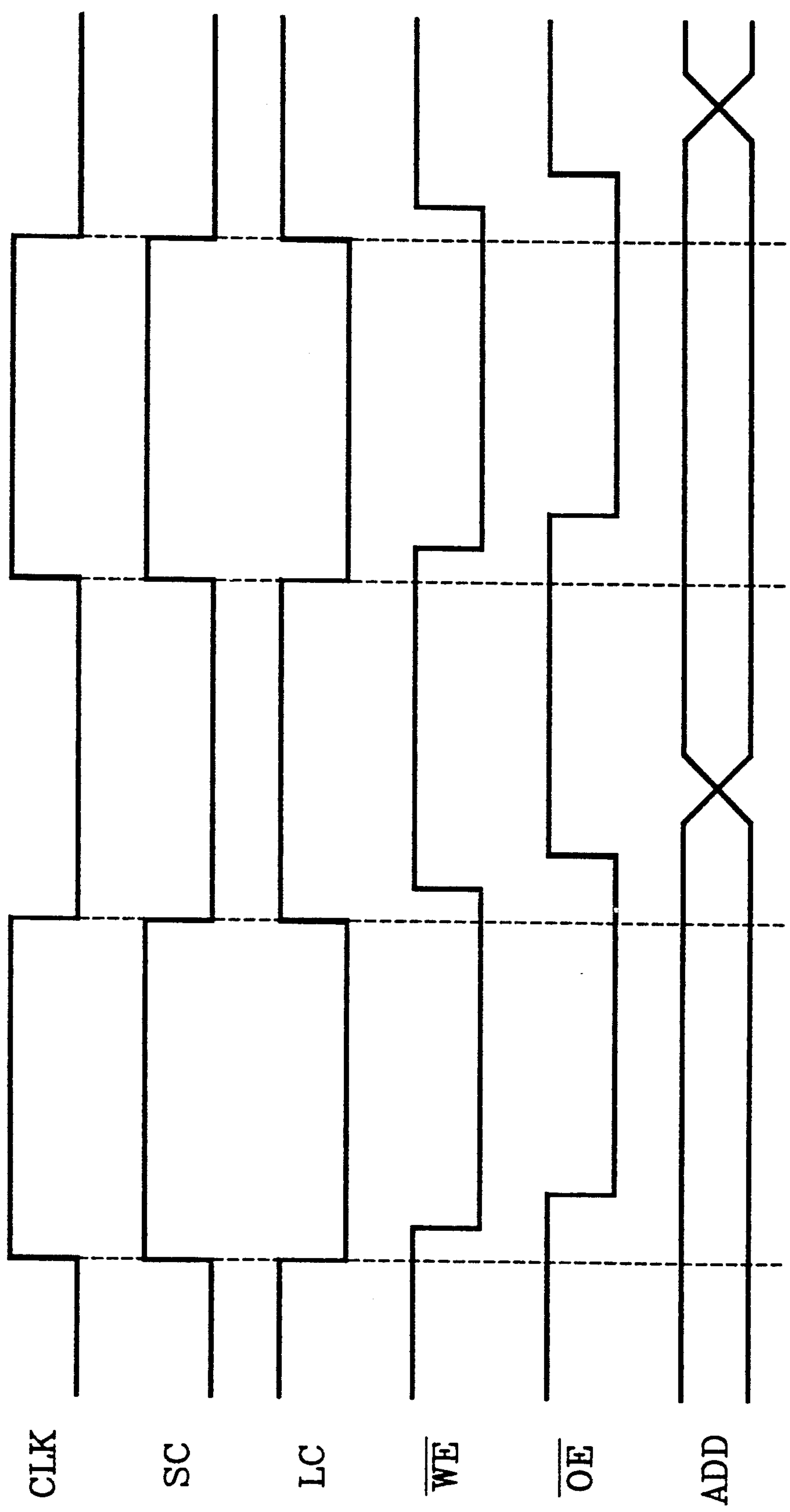
FIG. 4 is timing chart of an address and clock generator of FIG. 3.

Referring to FIG. 4, there is described an operation timing chart of the address and clock generator 32, in which the clock CLK is a basic clock externally provided, SC is shift clock to be provided to the local window register 28 and the broad window register 30, LC is latch clock to be provided to the output register 36, $\overline{WE}$ and ADD are respectively write enable and address signals both to be provided to the line memory 26, and $\overline{OE}$ is output enable signal for the local window register 28 and the broad window register 30.

Figure 5:
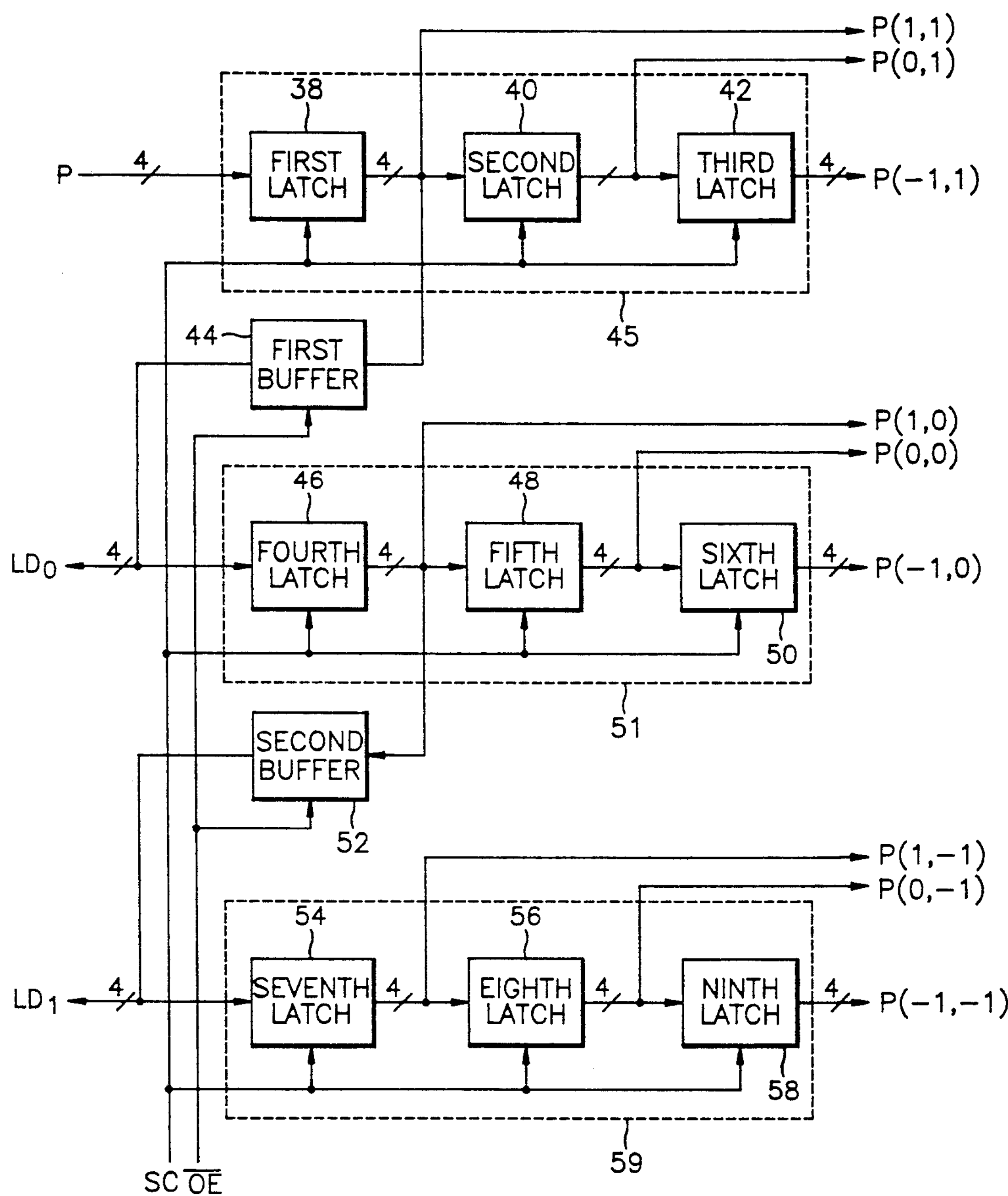
FIG. 5 is a detailed block diagram of a local window register of FIG. 3.

Referring to FIG. 5, the local window register 28 of FIG. 3 is described in detail, in which a number of latches for shifting the pixel data and a number of buffers for passing the pixel data to the line memory 26 are included.

Figures 6A, 6B:
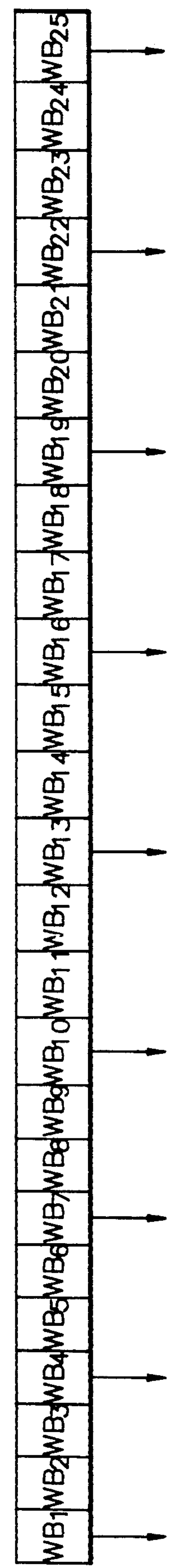
FIG. 6A is a diagram illustrating a pixel arrangement of a local window.
FIG. 6B is a detailed diagram of a broad window register of FIG. 3.

In FIG. 6B, the broad window register 30 of FIG. 3 is described practically, in which a number of shift registers are included to delay the pixel data delayed one line when received from the line memory 26. FIG. 6A shows a more detailed diagram of the pixel arrangements of the local window.

Figure 7A:
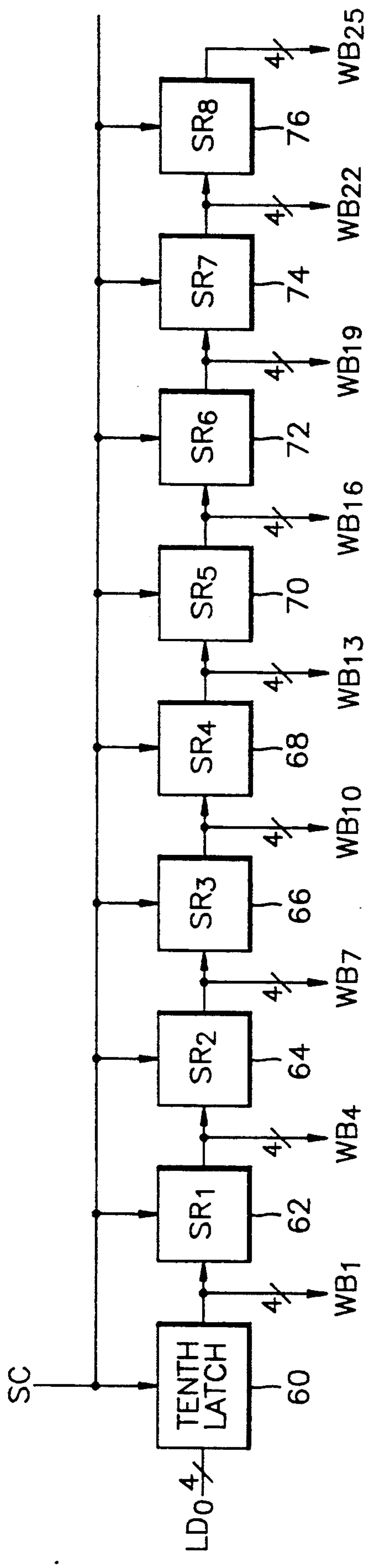
FIGS. 7A and 7B are respectively a detailed diagram of the broad window register and the local window register.
Figure 7B:
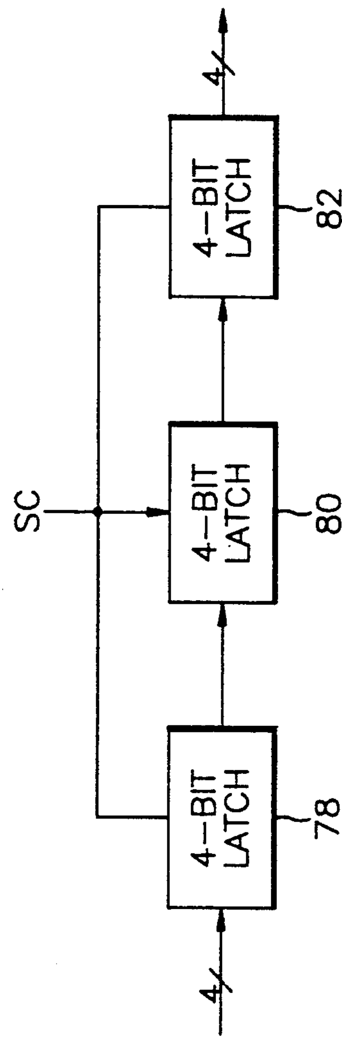

FIGS. 7B and 7A show the local window register 28 and the broad window register 30 respectively, by which the local window $WL_1$–$WL_{25}$ and the broad window $WB_1$–$WB_1$–$WB_{25}$ are formed.

Figure 8:
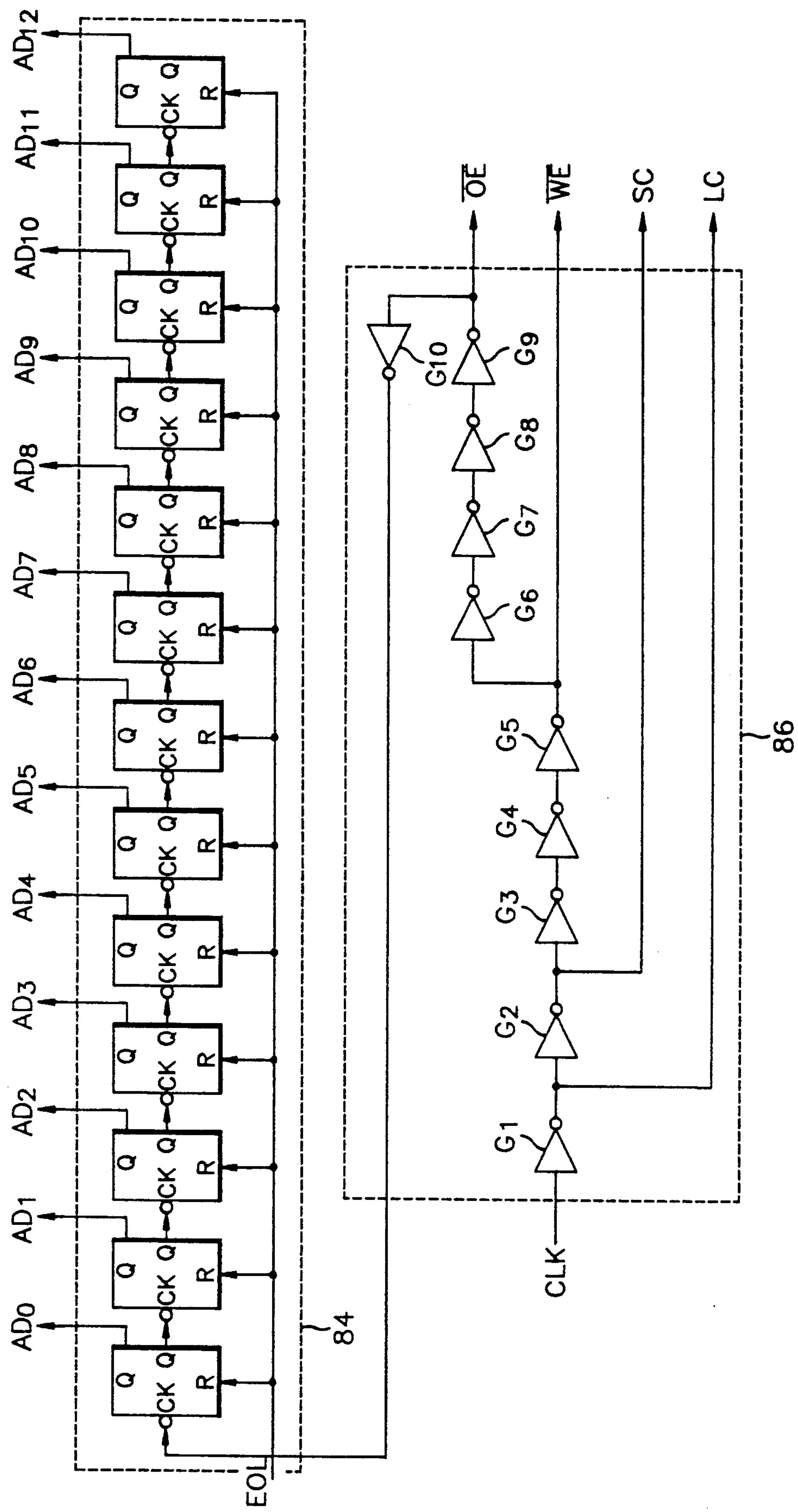
FIG. 8 is a detailed diagram of the address and clock generator of FIG. 3.

FIG. 8 illustrates the address and clock generator 32 of FIG. 3, in which a number of inverters respectively connected in series are used to generate the latch clock LC, the shift clock CS, the write enable signal $\overline{WE}$, and output enable signal $\overline{OE}$, the serially-connected inverters being for delaying and inverting the sampling clock CLK. In addition, a number of flip-flops are used to generate the address signals upon the basis of the output enable signal OE.

Figure 9:
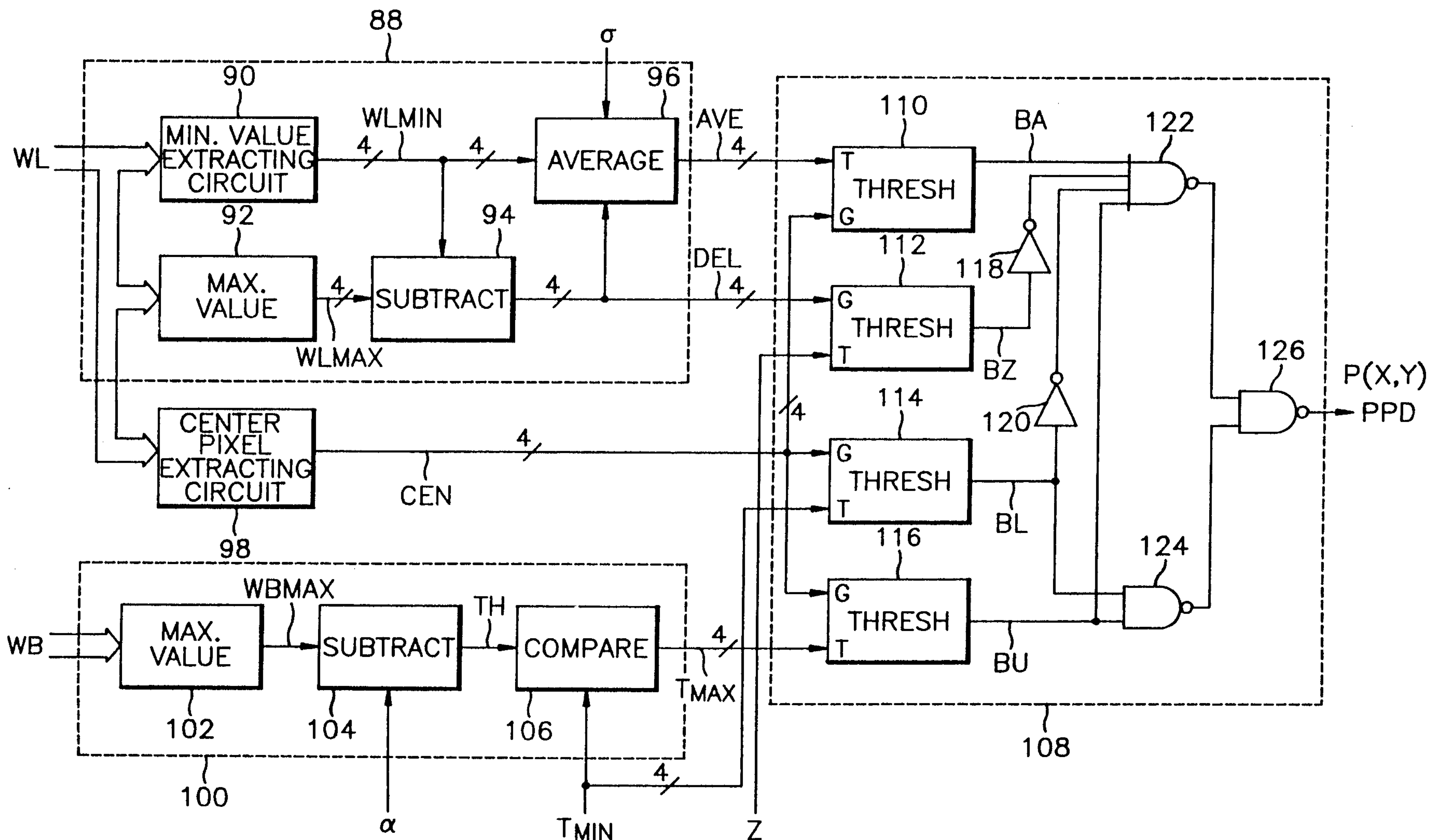
FIG. 9 is a detailed block diagram of an adaptive threshold unit logic of FIG. 3.

Referring to FIG. 9, there is shown the adaptive threshold logic unit 32 of FIG. 3 in detail, in which the logic unit includes a first operating circuit 88, a center pixel extracting circuit 98, a maximum threshold deciding circuit 100 and a multi-threshold unit 108. The first operating circuit 88 extracts the maximum value $WL_{MAX}$ and the minimum value $WL_{MIN}$ of the local window $WL_N$ from the local window data WL, received from the local window register 28 so as to obtain a level difference value DEL therebetween. Besides, the level difference value DEL and the minimum value $WL_{MIN}$ are operated with a first factor $\delta$ for controlling the average image density within the local window $WL_N$, thereby producing an average value AVE of the local window $WL_N$.

In the mean time, the center pixel extracting circuit 98 extracts a center value CEN from the local window data WL. The maximum threshold value deciding circuit 100 extracts a maximum value $WB_{MAX}$ from the broad window data WB received from the broad window register 30 to decide a threshold value TH of the background density by subtracting is a second factor $\delta$, which is white decision factor, from the maximum value $WB_{MAX}$. Thereafter, the threshold value TH is compared with a minimum threshold value Tmin received externally to select a bigger one as a maximum threshold value Tmax. Then, the multi-threshold unit 108 compares the center value CEN with the average value AVE from the first operating circuit, and the maximum threshold value Tmax and with the minimum threshold value Tmin, respectively to produce logic outputs. The logic outputs are combined in a predetermined manner by a logic combination circuit thereof to produce a binarized decision logic P(X,Y) of the center pixel.

Figure 10A:
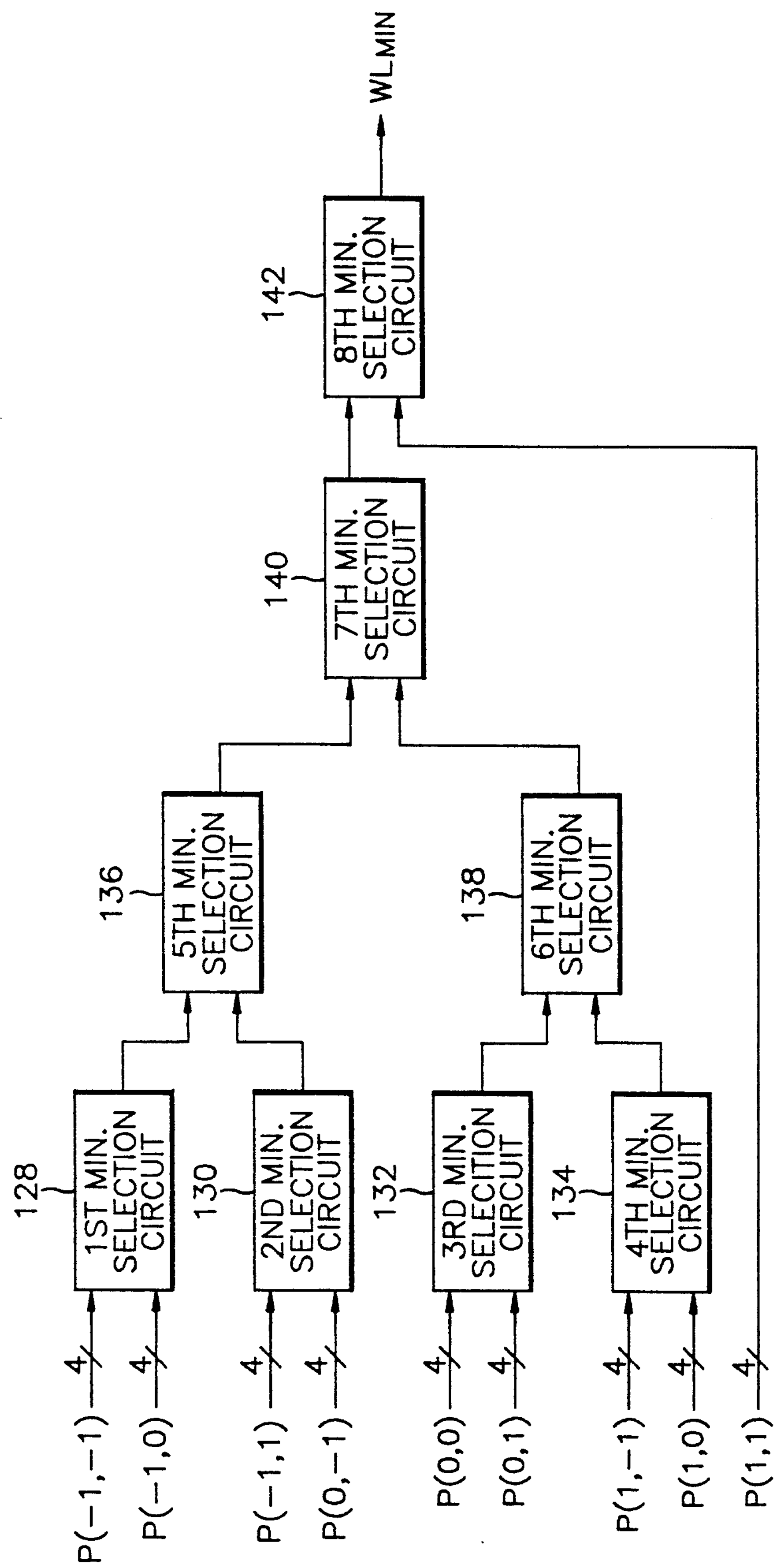
FIGS. 10A and 10B are detailed diagrams of a minimum value selector of FIG. 9.
Figure 10B:
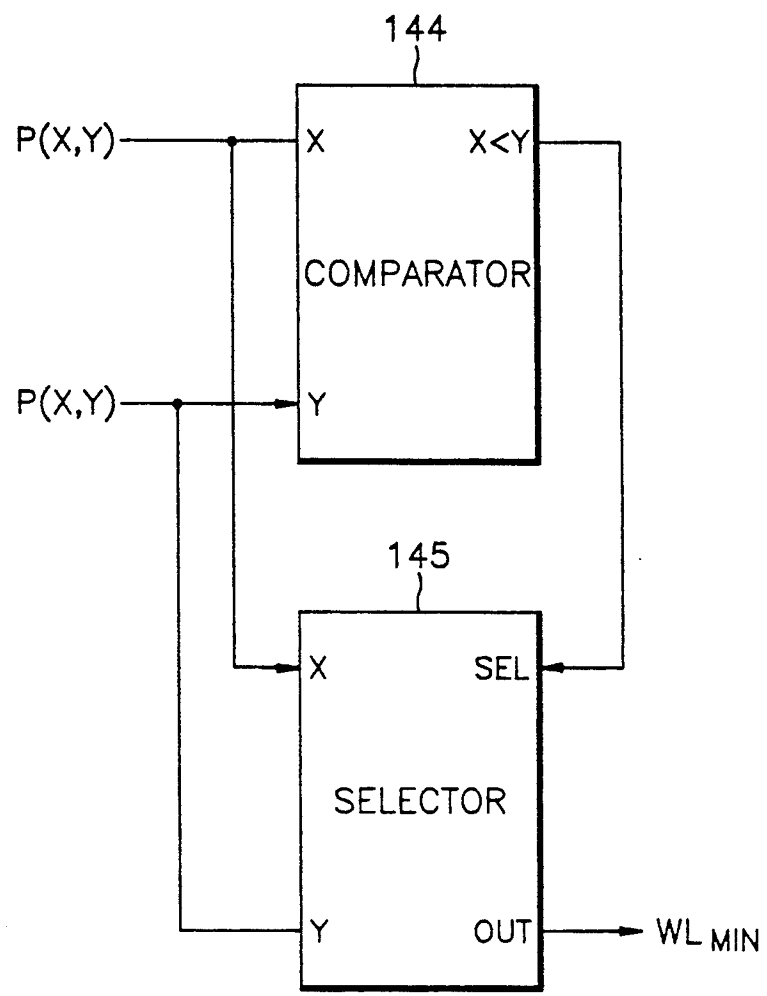

In FIG. 10A, a circuit 90, included in the first operating circuit 88 of FIG. 9, for extracting the minimum value $WL_{MIN}$ of the local window $WL_N$ is described in detail. It is constructed with a number of minimum value selecting circuits 128–142. The respective minimum value selecting circuits 128–142 shown in FIG. 10A include, as best illustrated in FIG. 10B, a comparator 144 for comparing given digital data A and B, and a selector 146 for selecting a minimum (less) value $WL_{MIN}$ from the above given data A and B, on the basis of the comparison result of the comparator 144.

Figure 11A:
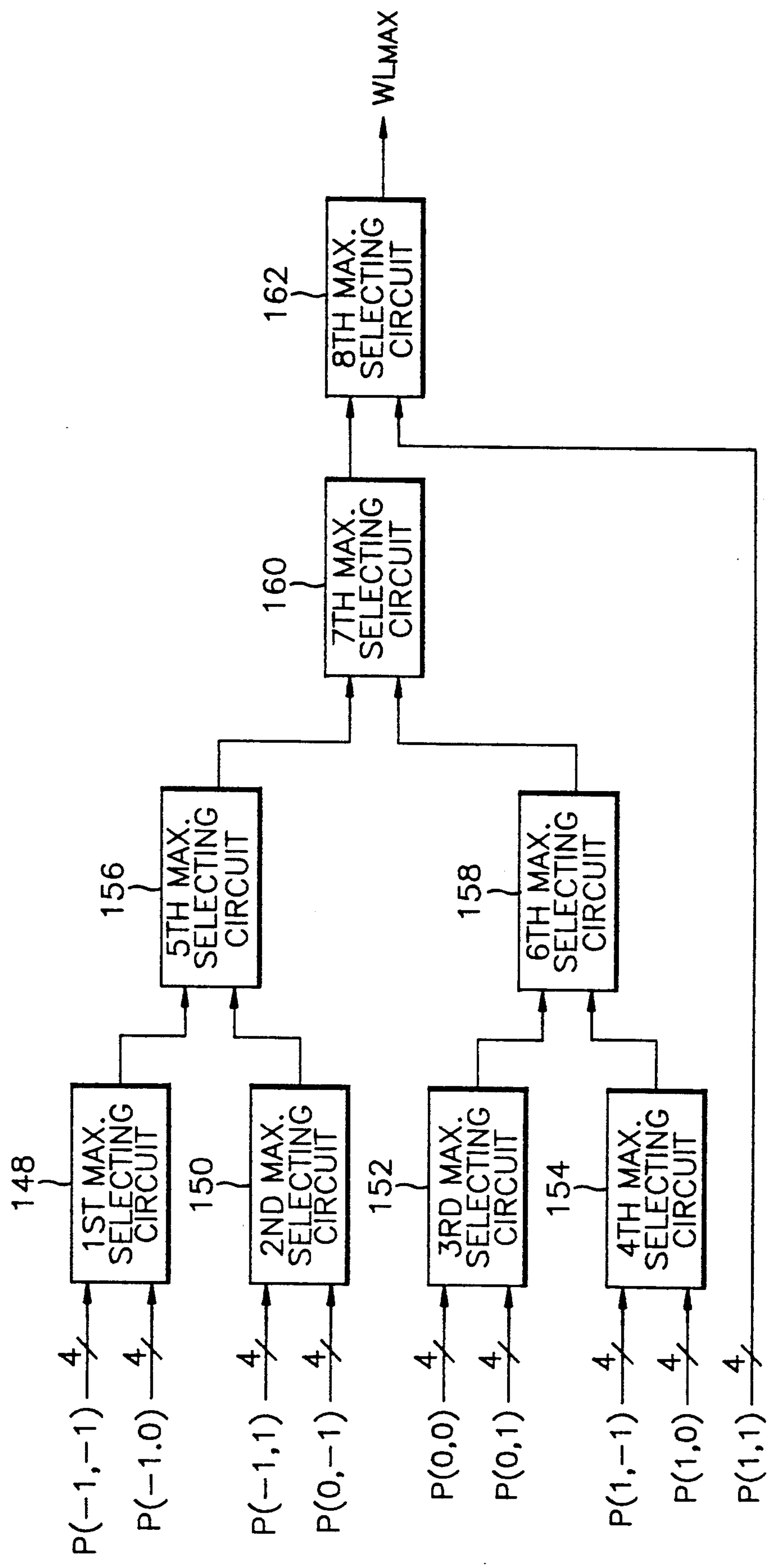
FIGS. 11A and 11B are detailed diagrams of a maximum value selector of FIG. 9.
Figure 11B:
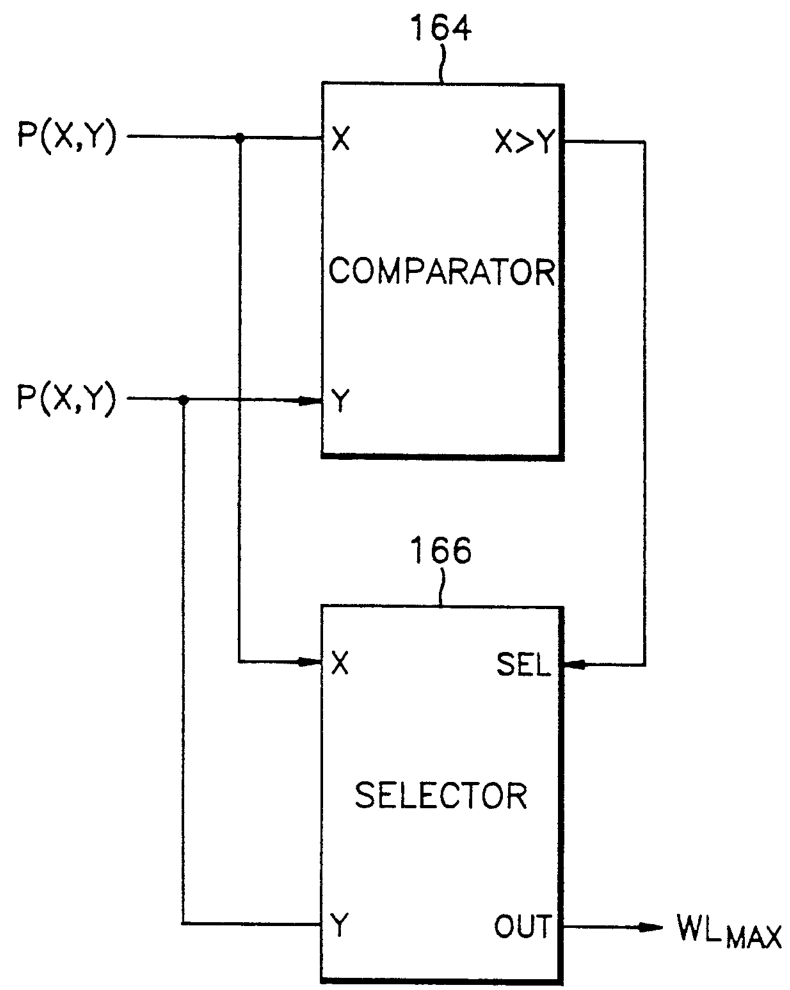

Referring to FIG. 11A, There is described in detail the circuit 92, included in the first operating circuit 88 of FIG. 9, for extracting the maximum value $WL_{MAX}$ of the local window $WL_N$. The circuit 92 is, as shown in the drawing, constructed with a number of maximum value selecting circuits 148–162. The maximum value selecting circuits 148–162 include, as best illustrated in FIG. 11B, a comparator 164 for comparing given logic data A and B, and a selector 166 for selecting a maximum (bigger) value $WL_{MAX}$ from the above given digital data A and B, on the basis of the comparison logic generated from the above comparator 164.

Figure 12:
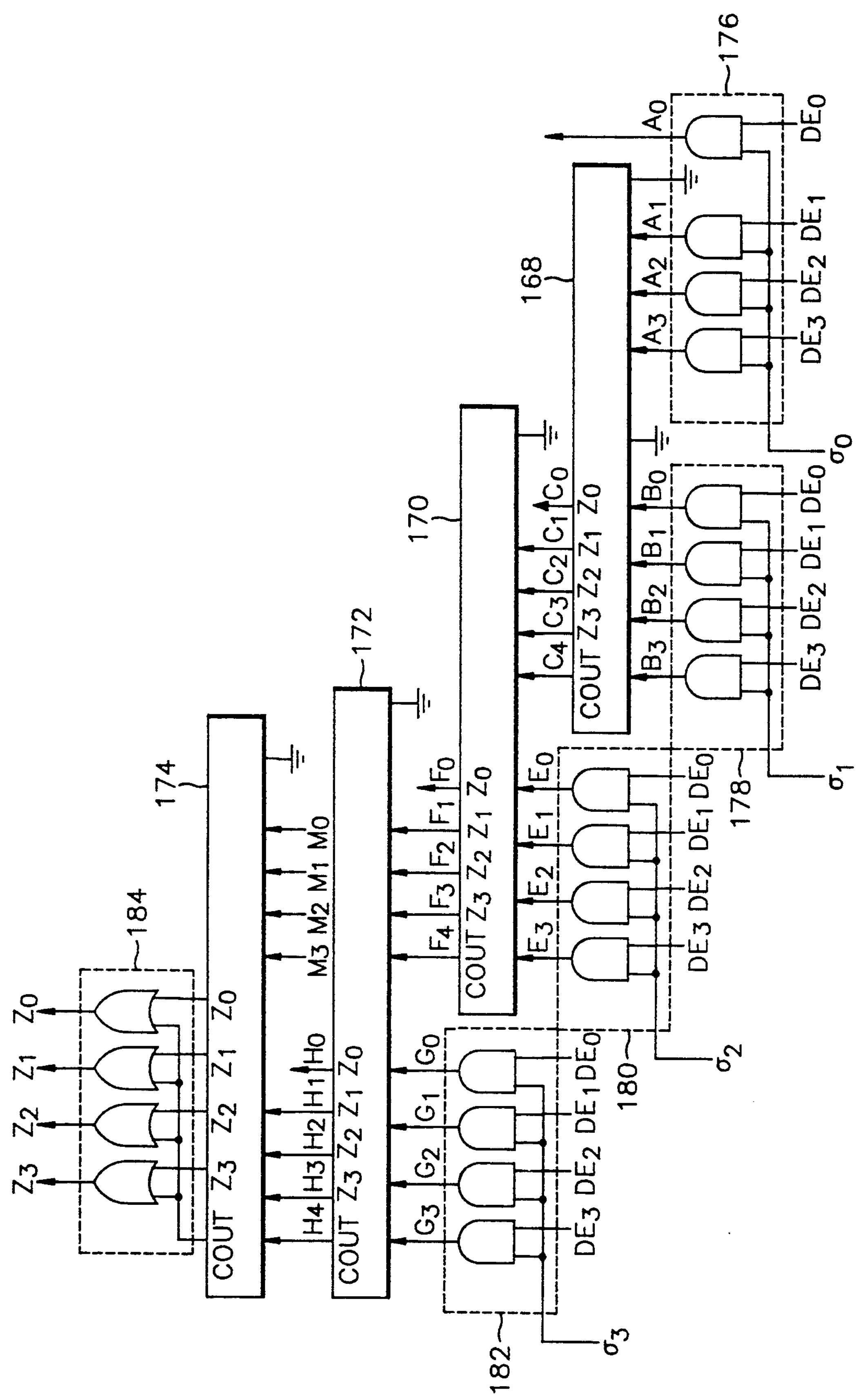
FIG. 12 is a detailed diagram of average value operator of a FIG. 9.

In FIG. 12, there is described in detail the circuit 96 for producing an average value AVE of the local window $WL_N$, included in the first operating circuit 88 of FIG. 9. That is to say, a first gating circuit 176 performs a logic AND operation between four-bit data $DE_0$–$DE_3$ of the level difference value DEL and the least significant bit (LSB) $\delta_0$ of the first factor $\delta$ which has four bits. A second gating circuit 178 performs a logic AND operation between the above four-bit data $DE_0$–$DE_3$ and the less significant bit $\delta_1$ of the first factor $\delta$. The results of the first and second gating circuits 176, 178 are added up in a first adder 168. In addition, a third gating circuit 180 performs a logic AND operation between the data $DE_0$–$DE_3$ and the better significant bit $\delta_2$ of the first factor $\delta$. The result of the third gating circuit 180 is added to the upper four bits of the first adder 168, in a second adder 170. A fourth gating circuit 182 then performs logic AND operation between the data $DE_0$–$DE_3$ and the most significant bit $\delta_3$ of the first factor $\delta$. In the same way, the result of the fourth gating circuit 182 is added to the upper four-bit data of the second adder 170, in a third adder 172. Moreover, a fourth adder 174 adds the upper four-bit data of the third adder 172 to the maximum vale $LM_{MAX}$ of four-bit data $M_0$–$M_3$. Thus, an OR gating circuit 184, which includes four OR gates therein, produces an average value AVE of the local window $WL_N$ by performing logic OR operation between the most significant bit of the fourth adder 174 and other four bits thereof.

The embodiment of the present invention will now be described with reference to FIGS. 3–12.

Once the local window register 28, of FIG. 3 as illustrated in detail in FIG. 5, receives pixel data having four bits, i.e., 16 levels ($2^4=16$) of the brightness, a first latch 38 thereof latches and shifts the pixel data. As usual, the above pixel data are the image signals which were obtained by scanning of the CCD image sensor (not illustrated) and corrected at a shading correction part after converted into digital data by an analog-to-digital converter. The pixel data can be expressed in function of position according to the respective pixel data which has a binarized logic level. Namely, since the pixel data exist on a surface of a document, they can be written as a two-dimensional function of $$P(X, Y) \quad (1)$$

All latches in the local window register 28 can receive the pixel data according to the shift clock SC provided from the address and clock generator 32.

On the other hand, the address and clock generator 32, constructed as shown in FIG. 8, generates the shift clock SC, the latch clock LC, the write enable signal $\overline{WE}$, and output enable signal $\overline{OE}$, illustrated in FIG. 4. The above clock signals are generated by a delay/buffering circuit 86 including a number of inverters $G_1$–$G_{10}$, in which the sampling clock CLK is synchronized with the sampling clock pulse used in the CCD image sensor.

The above explained clock and enable signals generated in this way are applied to first and second buffers 44, 52, a number of latches, a tenth latch 60 in the broad window register 30 and a number of shift registers 62–76. The address generator 84 of the address and clock generator 32, constructed with a number of flip-flops in asynchronous manner, the flip-flops being coupled in series, generates the address signals $AD_0$–$AD_{12}$ by counting the output of the inverter $G_{10}$ for inverting the output enable signal $\overline{OE}$. The address generator 84 is reset by receiving an $\overline{EOL}$ (end of line) signal which means that a line of the document is ended. Therefore, when document image scan data of a new line is received, the address generator 84 re-counts at an initial address.

Referring back to FIG. 5, if the first latch 38 latches the pixel data P and applies it to the second latch 40 and a first buffer 44, then the first buffer 44 transfers the pixel data P to an I/O port $LD_0$ of the line memory 26 to write the pixel data thereon, on the basis of the output enable signal $\overline{OE}$. The present pixel data written into the line memory 26 can be read out by the write enable signal $\overline{WE}$ shown in FIG. 4, to be latched to a fourth latch 46. In the same way, the output of the fourth latch 46 is written into the line memory 26 via a second buffer 52 and an I/O port $LD_1$, on the basis of the output enable signal $\overline{OE}$.

The pixel data written into the line memory 26 via the I/O port $LD_1$ are read out in a while by a read enable signal to be latched to a seventh latch 54. In this case, the line memory 26 must include at least two memory sections, in which each memory section can store the pixel data of at least one line. The write and read enable signals and address signals are controlled by the address and clock generator 32, in the same way. Therefore, if the pixel data P of three lines has been applied to the local window register 28, pixel data P corresponding to each line are respectively latched to a first shift register 45 (first, second and third latch 38, 40, 42), a second shift register 51 (fourth, fifth, sixth latch 46, 48, 50) and a third shift register 59 (seventh, eighth, ninth latch 54, 56, 58). In other words, the three pixel data P of the present line are temporarily stored in the first shift register 45, the three pixel data P, delayed by one line, of the preceding line are temporarily stored in the second shift register 51 and the three pixel data P, delayed by two lines, of the line before the preceding line are temporarily stored in the third shift register 59. Accordingly, the three pixel data respectively stored into the first through third shift registers 45, 51, 59 is all the same in their vertical position, although they are different in their lines, because the I/O ports $LD_0$ and $LD_1$ of the line memory 26 are addressed at the same time. Therefore, a three-by-three local window $WL_N$ as shown in FIG. 6A can be formed by the local window register 28 constructed as FIG. 5, producing the local window data WL.

The broad window register 30 coupled to the I/O port $LD_1$ of the line memory 26 shifts the preceding pixel data being delayed by one line, received from the line memory 26 through the I/O port $LD_1$ according to the shift clock SC, by a number of the shift registers 62–76, thereby producing broad window data $WB_N$ ($WB_1$–$WB_{25}$) as shown in FIG. 6B.

The plurality of shift registers 62–76 for substantially embodying the broad window register 30 are detailed in FIG. 7A and the first through the third shift registers 45, 51, 59 used in the local window register 28 are detailed in FIG. 7B. Therefore the broad window register 30 shifts a total of twenty-five pixel data $WB_1$–$WB_{25}$, each data constructed with four bits, and nine pixels $WB_1$, $WB_4$, $WB_7$, $WB_{10}$, $WB_{13}$, $WB_{16}$, $WB_{19}$, $WB_{22}$, $WB_{25}$ of the pixel data are sampled to be outputted. The above explained local window data $WL_N$ and broad window data $WB_N$ are two-dimensional window function, but herein expressed in one-dimensional window function, and more particularly represent the local window for local processing of each pixel P(X,Y) and the broad window for conversion processing of the background image. In the above local window data $WL_N$ and broad window data $WB_N$, the N represents the size of the window and is an odd constant number. Therefore, the window function $W_N$ is written as $$W_N=[P(X+a,\ Y+b)] \tag{2}$$

wherein, the a, b=0, 1, 2, 3, . . . , (n−1)/2. According to the Equation (2), the local window data $WL_N$ and the broad window data $WB_N$ are $$WL_N=[P(X+a,\ Y+b)] \tag{3}$$

$$WB_N=[P(X+a,\ Y+b)] \tag{4}$$

As shown in FIG. 9 through FIG. 11B, the minimum value extracting circuit 90 and the maximum extracting circuit 92 of the adaptive threshold logic unit 34 receive the local window data constructed with a total of thirty-six bits generated from the local window register 28 so as to produce the minimum pixel data $WL_{MIN}$ having the minimum level and the maximum pixel data $WL_{MAX}$ having the maximum level.

The minimum value extraction circuit 90 is constructed as FIG. 10A, in which a first through fourth minimum value selecting circuits 128, 130 132, 134 receive respectively the local window data $WL_N$ of FIG. 6A, which are P(−1,−1), P(−1,0) P(−1,1), P(0,−1), P(0,0), P(0,1), P(1,−1), P(1,0), P(1,1). In the above expression, the P represents the gray level of a pixel which can be expressed as a position function of the pixel. Furthermore, the pixel can be expressed as a two-dimensional function P(X,Y) because the image exists on a plan surface two-dimensionally.

The first through fourth minimum selecting circuits 128, 130, 132, 134 compare the gray level of the pixel data received so as to select the pixel data having the lower gray level. The output of the first minimum selecting circuit 128 and the second minimum selecting circuit 130 are applied to a fifth minimum selecting circuit 136, while the outputs of the third and fourth minimum selecting circuits 132, 134 are applied to a sixth minimum selecting circuit 138. The fifth and sixth minimum selecting circuits 136, 138 select respectively a lower gray level of the received pixel data. The outputs of the fifth and sixth minimum selecting circuits 136, 138 are again applied to a seventh minimum selecting circuit 140 which also selects a lower gray level of the pixel data. The output of the seventh minimum selecting circuit 140 and the pixel data P(1,1) are applied to an eighth minimum selecting circuit 142 so as to select a lower gray level of pixel data. In this manner, a minimum value pixel data $WL_{MIN}$ can be selected finally to provide it to the average value operating circuit 96.

The respective minimum selecting circuits 128–142 include a comparator 144 for comparing two input data and a selector 146 for selecting a pixel data having lower gray level from the input data according to the result of the comparator 144, as best illustrated in FIG. 10B.

On the other hand, the maximum value selecting circuit 92 of the first operating circuit 88 receiving the local window data $WL_N$ extracts the maximum value $WL_{MAX}$ having the maximum gray level within a local window. In structure, the maximum value extracting circuit 92 is as shown in FIG. 11A. In its operation, it is similar to the minimum value extracting circuit 90 except that respective maximum value selecting circuits 148-162 select a pixel data having higher gray level, thereby selecting a pixel data having the maximum gray level. Practically, the respective maximum value selecting circuits 148-162 include a comparator 164 for comparing two input data and a selector 166 for selecting the input having the higher value according to the output of the comparator 164, as best illustrated in FIG. 11B.

The center pixel extracting circuit 98 of FIG. 9 is to extract a center pixel data to be binarized to white or black from the local window data $WL_N$ of FIG. 6A. In this embodiment, the center pixel is considered as P(0, 0) and is called CEN.

In the mean while, the minimum value $WL_{MIN}$ and the maximum value $WL_{MAX}$, extracted as in the above explained way, are provided to a first subtracter 94 to subtract the minimum value $WL_{MIN}$ from the maximum value $WL_{MAX}$. The level difference DEL caused by above operation is therefore $$DEL=WL_{MAX}-WL_{MIN} \quad (5)$$

The level difference DEL of Equation (5) is applied to the average value operating circuit 96, of which detailed circuitry diagram is illustrated in FIG. 12, to produce an average value AVE which can be written as $$AVE=WL_{MIN}\times\delta+DEL \quad (6)$$

The average value AVE and level difference DEL of the local window which are obtained by the Equation (5) and (6) are applied to a first and second threshold deciding circuits 110, 112. In the Equation (6), the δ is a first factor having four bits for controlling density of the document image within the local window WL and the factor δ is $0<\delta 1.0$.

As apparent from the Equation (6), if the first factor δ approaches to zero, then the average value AVE approaches to the minimum value $WL_{MIN}$. If, however, the first factor δ approaches to one, then the average value AVE approaches to the maximum value $WL_{MAX}$. Therefore, the average level (average density of the document) of the local window data $WL_N$ can be controlled by varying the first factor δ.

Assuming that the minimum value $WL_{MIN}$ of the minimum value extracting circuit 90 is $M_0$-$M_3$, the level difference DEL of the first subtracting circuit 94 is $DE_0$-$DE_3$ and the first factor δ is $\delta_0$-$\delta_3$, then the operation of the average value operating circuit illustrated in FIG. 12 can be expressed as (7)

| | | | | | | | | |
|---|---|---|---|---|---|---|---|---|
| | | | | | DE3 | DE2 | DE1 | DE0 |
| | | | | | δ3 | δ2 | δ1 | δ0 |
| DELX δ0 | | | | | A3 | A3 | A1 | A0 |
| DELX δ1 | | | | B3 | B2 | B1 | B0 | . |
| DELX(δ1 + δ0) | | | C4 | C3 | C2 | C1 | C0 | . |
| DELX δ2 | | | E3 | E2 | E1 | D0 | . | . |
| DELX(δ2 + δ1 + δ0) | | F4 | F3 | F2 | F1 | F0 | . | . |
| DELX δ3 | | G3 | G2 | G1 | G0 | . | . | . |
| DELX δ | H4 | H3 | H2 | H1 | H0 | . | . | . |
| | . | . | . | . | . | . | . | . |
| | . | . | . | . | . | . | . | . |
| | . | . | . | . | . | . | . | . |
| MSB | H4 | H3 | H2 | H1 | H0 | F0 | C0 | A0 LSB |

Therefore, average value $AVE_Z$ operated on the basis of the Equation (7) is $$AVE_Z=WL_{MIN}+(\delta\times DEL)/16 \quad (8)$$

It is understood that result of Equation (8) satisfies Equation (6).

In the mean time, the maximum value extracting circuit 102 in the maximum threshold deciding circuit 100 receives the broad window data $WB_N$ generated from the broad window register 30 so as to extract the maximum value $WB_{MAX}$ having maximum gray level from the nine broad window data $WB_1$, $WB_4$, $WB_{10}$, $WB_{13}$, $WB_{16}$, $WB_{19}$, $WB_{22}$, $WB_{25}$, sampled as shown in FIG. 6B. The structure of the maximum value extracting circuit 102 is substantially the same with that of FIGS. 11A and 11B. The maximum value $WB_{MAX}$ of the broad window $WB_N$ produced from the maximum value extracting circuit 102 is applied to a second subtracter 104. The second subtracter 104 subtracts a second factor α from the maximum value $WB_{MAX}$ of the broad window $WB_N$, thereby obtaining the maximum threshold value Tmax which is given as $$Tmax=BW_{MAX}-\alpha \quad (9)$$

The second factor α is a four-bit data that is determined by the characteristics of the CCD image sensor. That is to say, the second factor α determines a degree of gray level, above the degree being regarded as white. Thus, the second subtracter 104 subtracts the second factor α, which is off-set value, from the maximum value $WB_{MAX}$ of the broad window data $WB_N$, the output thereof being applied to a maximum value extracting circuit 106 as a maximum threshold value Tmax for determining the white level of the pixel data. At about the same moment, a minimum threshold value Tmin for determining the black level of the pixel data is applied to the maximum value extracting circuit 106, the minimum threshold value Tmin having four-bit data. The maximum threshold Tmax and the minimum threshold Tmin are for establishing externally the gray zone ranged from the level 5 to the level 11, the maximum and minimum threshold Tmax, Tmin being applied to the third and fourth threshold deciding circuits 114, 116, respectively.

On the other hand, the first threshold deciding circuit 110 receives the average level AVE of the average value operating circuit 96 and the center pixel level CEN of the center pixel extracting circuit 98 to produce a first decision logic BA by comparing the above two levels. The first decision logic BA is $$BA = THR(CEN, AVE) \quad (10)$$

The first decision logic BA is to decide whether the center pixel is black or white, by comparing the level of the center pixel CEN with the circumference level of the local window $WL_N$. Namely, the center pixel CEN is binarized by the average value AVE of the local window $WL_N$.

The second threshold decision circuit 112 compares the level difference DEL of the first subtracter 94 with a third factor Z applied from the exterior to obtain a second decision logic BZ.

$$BZ = THR(DEL, Z) \quad (11)$$

The third factor Z is an adjustment factor, which is in advance set to a predetermined degree, for adjusting the density of the image. The third factor Z has a function of allowing an image to be lighter by taking the center pixel CEN for minimum value Tmin (white) in case that the level (black or white) of the center pixel CEN to be determined has little variation. Therefore, the logic low of the second decision logic BZ implies that the level difference of the pixel data of the local window is considerable. In this case the background level is relatively bright (emphasized).

The third and fourth threshold deciding circuits 114 and 116 respectively produce a third decision logic BL and a fourth decision logic BU as given in Equations (12), (13).

$$BL = THR(CEN, Tmin) \quad (12)$$

$$VU = THR(CEN, Tmax) \quad (13)$$

From Equation (12), it is noted that when the level of the center pixel CEN is lower than that of the minimum threshold value Tmin(CEN<Tmin), the center pixel CEN is determined to be black From Equation (13), it is also noted that if the level of the center pixel CEN is higher than that of the maximum threshold value Tmax (CEN>Tmax), the center pixel CEN is determined to be white. Therefore, the third decision logic BL is to determine that the center pixel CEN is black level. The fourth decision logic BU is to determine that the center pixel CEN is white level.

The second and third decision logic BZ, BL are inverted respectively by the inverters 118, 120 to be applied to a NAND gate 122, together with the first and third decision logic BA, BU. In addition, the third and fourth decision logic BL, BU are applied to a NAND gate 124. The output of the NAND gates 122 and 124 is applied to an output NAND gate 126. The NAND gate 126 performs logic NAND operation to determine whether the level of the center pixel CEN of the local window $WL_N$ is black or white. If the output of the NAND gate 126 is P(X,Y), then $$P(X,Y) = BU \cdot \overline{BL} \cdot \overline{BZ} \cdot BA + BU \cdot BL \quad (14$$

In Equation (14), if P(X,Y) is logic low, then the center pixel CEN is white, or otherwise, the center pixel CEN is black.

As described heretofore, the present invention establishes a local window and a broad window from document image signals scanned by a CCD image sensor. An average level and a level difference between a maximum and a minimum level of the image signals are extracted from the local window. A maximum threshold of the background of the document is extracted from the broad window. Thus, the image signals can be binarized with an adaptive threshold. Accordingly, the present invention has an advantage of providing an improved image, although the document image is collected (scanned) from material whose brightness distribution is considerably ununiform.

While the invention has been particularly shown and described with reference to a preferred embodiment, it will be understood by those skilled in the art that modifications in detail may be made without departing from the spirit and scope of the invention.

What is claimed is:

1. A device for processing a document image signal with an adaptive threshold, said device comprising:

a line-memory for receiving and temporarily storing the document image signal to provide a preceding scan line and a scan line before said preceding scan line of said document image signal;

a local window register for receiving said preceding scan line and said scan line before said preceding scan line from said line-memory, and for providing a local window comprised of pixel values from a present scan line, said preceding scan line and said scan line before said preceding scan line, said local window having a center pixel;

a broad window register for receiving said preceding scan line and for providing an horizontal broad window comprised of pixel values from said preceding scan line; and an adaptive threshold logic unit producing black/white decision logic for said center pixel in response to a maximum pixel value in said horizontal broad window, a difference value representing a difference between a maximum pixel value in said local window and a minimum pixel value in said local window, an average pixel value in said local window and a center pixel value in said local window.

2. A circuit for gray level processing of document image signals in a document image signal processor, comprising:

line memory means for receiving and storing a document image signal in the form of scan lines provided by said line memory means and for providing said scan lines;

local window generating means for receiving a present scan line, a preceding scan line and a scan line before said preceding scan line, said preceding scan line and said scan line before said preceding scan line being delayed and provided by said line memory means, and for shifting a portion of said scan lines to form a local window;

broad window generating means for receiving a predetermined number of scan lines and for shifting a portion of said scan lines to form a broad window, larger than said local window; and adaptive threshold logic means for receiving signals from said local window generating means and said broad window generating means and for determining an adapted document image signal based on the brightness relationships of the local window and the broad window.

3. A circuit as set forth in claim 2, wherein said broad window generating means receives said preceding scan line, said preceding scan line being delayed and provided by said line memory means.

4. A circuit as set forth in claim 2, further comprising signal generating means for synchronizing said line memory means, said local window generating means, and said broad window generating means to a clock signal.

5. A circuit as set forth in claim 2, wherein said adaptive threshold logic means extracts a maximum brightness value, a minimum brightness value, an average brightness value, and a center pixel brightness value for pixels in said local window and extracts a maximum brightness value from said broad window and produces one of a black and white logic value for a center pixel in said local window based on said maximum brightness value, said minimum brightness value, said average brightness value and said center pixel brightness value for said pixels in said local window and based on said maximum brightness value for pixels in said broad window.

6. A circuit as set forth in claim 5, further comprising signal generating means for synchronizing said line memory means, said local window generating means, and said broad window generating means to a clock signal.

7. A circuit for gray level processing of document image signals in a document image signal processor, comprising:

line memory means for receiving and storing a document image signal in the form of scan lines provided by said line memory means and for providing said scan lines;

local window generating means for receiving a predetermined number of scan lines provided by said line memory means and for shifting a portion of said scan lines to form a local window;

broad window generating means for receiving a predetermined number of scan lines and for shifting a portion of said scan lines to form a broad window, larger than said local window; and adaptive threshold logic means for extracting a maximum brightness value, a minimum brightness value, an average brightness value, and a center pixel brightness value for pixels in said local window, for extracting a maximum brightness value for pixels in said broad window, and producing one of a black and white logic value for a center pixel in said local window based on said maximum brightness value, said minimum brightness value, said average brightness value and said center pixel brightness value for said pixels in said local window and based on said maximum brightness value for pixels in said broad window.

8. A circuit as set forth in claim 7, further comprising signal generating means for synchronizing said line memory means, said local window generating means, and said broad window generating means to a clock signal.

9. A process for gray level processing of document image signals, comprising:

receiving a document image signal;

storing said document image signal in the form of scan lines;

generating local windows, each of said local windows being generated from a portion of a predetermined number of said scan lines;

generating broad windows, each of said broad windows being larger than said local windows, each of said broad windows being generated from a portion of a predetermined number of said scan lines;

extracting a maximum brightness value, a minimum brightness value, an average brightness value, and a center pixel brightness value for pixel values in each of said local windows;

extracting a maximum brightness value for pixel values in each of said broad windows; and producing a black or white logic value for a center pixel in each of said local windows based on said maximum brightness value, said minimum brightness value, said average brightness value, and said center pixel brightness value from said local windows and said maximum brightness value from said broad windows.

10. A device for processing a document image signal with an adaptive threshold, said device comprising:

local window register means for providing local windows, each of said local windows being three by three windows comprising pixel values from first scan lines, second scan lines and third scan lines;

broad window register means for providing broad windows of pixel values; and adaptive threshold means for determining whether object pixels represent one of black pixels and white pixels in response to a group of pixel values, said group of pixel values comprising a maximum pixel value of pixel values in said horizontal broad windows, a maximum pixel value of pixel values in said local windows, and a minimum pixel value of pixel values in said local windows.

11. The device claimed in claim 10, wherein said broad windows of pixel values comprises pixel values from said second scan lines.

12. The device claimed in claim 11, wherein said broad windows comprise approximately one quarter of the bits in said second scan lines.

13. The device claimed in claim 10, wherein said local windows of pixel values are square windows.

14. The device claimed in claim 10, wherein said broad windows of pixel values comprise pixel values in only one scan line.

15. The device claimed in claim 10, wherein said object pixel is a center pixel in said local windows.

16. The process claimed in claim 9, wherein said decision of whether said object pixels represent black or white pixels is based upon the equation:

(said center pixel brightness value is greater than said maximum brightness value of said broad window − K), or (said center pixel brightness value is less than a minimum threshold) or (A is greater than said maximum brightness value for said local window − said minimum brightness value for said local window) or (said center pixel brightness value is greater than said minimum brightness value for said local window + B·(maximum brightness value for said local window − minimum brightness value for said local window)) and ((said center pixel brightness value is greater than said maximum brightness value of said broad window − K) or (said center pixel brightness value is greater than said minimum threshold)); wherein:

K is constant related to characteristics of an image sensor;

A is constant for adjusting density, and

B is a constant for adjusting density with said local window.

17. A device for processing a document image signal comprising pixel values representing brightness of pixels in a raster scanned document, said device comprising:

local window register means for providing a local window of said pixel values of pixels surrounding a current pixel;

broad window register means for providing a broad window of said pixel values of linearly related to said current pixel; and adaptive threshold generating means for assigning to said current pixel one of two brightness values based on a threshold generated in response to a maximum one of said pixel values in said local window, a minimum one of said pixel values in said local window, an average of said pixel values in said local window, and a maximum one of said pixel values in said broad window.

18. A device as claimed in claim 17, wherein said local window comprises said pixel values for pixels adjoining said current pixel.

19. A device as claimed in claim 18, wherein said broad window comprises said pixel values for pixels in a same lateral row as said current pixel.

20. A device for processing a document image signal comprising pixel values representing brightness of pixels in a raster scanned document, said device comprising:

local window register means for providing a local window of said pixel values of pixels surrounding a current pixel;

broad window register means for providing a broad window of said pixel values of linearly related to said current pixel; and adaptive threshold generating means for assigning to said current pixel one of two brightness values based on a threshold generated in response to a comparison of an average of said pixels values in said local window with a pixel value corresponding to said current pixel and a comparison of said pixel value corresponding to said current pixel with a maximum one of said pixel values in said broad window.

21. A device for processing a document image signal comprising pixel values representing brightness of pixels in a raster scanned document, said device comprising:

local window register means for providing a local window of said pixel values of pixels surrounding a current pixel;

broad window register means for providing a broad window of said pixel values of linearly related to said current pixel; and adaptive threshold generating means for assigning to said current pixel one of two brightness values based on a threshold generated in response to a comparison of an average of said pixels values in said local window with a pixel value corresponding to said current pixel, a comparison of said pixel value corresponding to said current pixel with a maximum one of said pixel values in said broad window, and a comparison of a minimum one of said pixel values in said local window with a selected density.

* * * * *

UNITED STATES PATENT AND TRADEMARK OFFICE

CERTIFICATE OF CORRECTION

PATENT NO. : 5,268,773

DATED : December 7, 1993

INVENTOR(S) : Yong-Woo Park; et al.

It is certified that error appears in the above-indentified patent and that said Letters Patent is hereby corrected as shown below:

IN THE ABSTRACT

Item [57], Line 2, After "facsimile", Insert --OCR scannner or other optical device-- ;

Line 4, Preceding "document", Insert --the-- ;

Line 12, Preceding "improved", Insert --an-- .

Column 2, Line 22 , Change "level" to --levels-- ;

Column 3, Line 65, Preceding "average", Insert --an-- ;

Column 5, Line 43, Change "δ" to --α-- ;

Line 51, After "Tmax", Delete "and" ;

UNITED STATES PATENT AND TRADEMARK OFFICE
CERTIFICATE OF CORRECTION

PATENT NO. : 5,268,773

DATED : December 7, 1993

INVENTOR(S) : Yong-Woo Park; et al.

It is certified that error appears in the above-indentified patent and that said Letters Patent is hereby corrected as shown below:

Column 9, Line 42, Change " $AVE = WL_{MIN} \times \delta + DEL$" to --$AVE = WL_{MIN} + \delta \times DEL$--.

Signed and Sealed this

Eighth Day of November, 1994

Attest:

BRUCE LEHMAN

*Attesting Officer*

*Commissioner of Patents and Trademarks*